US009465044B2

(12) United States Patent  
Anderson (10) Patent No.: US 9,465,044 B2  
(45) Date of Patent: Oct. 11, 2016

(54) ANGULAR VELOCITY ESTIMATION USING A MAGNETOMETER AND ACCELEROMETER

(71) Applicant: Kionix, Inc., Ithaca, NY (US)

(72) Inventor: Erik Anderson, Sunnyvale, CA (US)

(73) Assignee: KIONIX, INC., Ithaca, NY (US)

( * ) Notice: Subject to any disclaimer, the term of this patent is extended or adjusted under 35 U.S.C. 154(b) by 682 days.

(21) Appl. No.: 13/735,815

(22) Filed: Jan. 7, 2013

(65) Prior Publication Data

US 2014/0195185 A1    Jul. 10, 2014

(51) Int. Cl.
*G01P 3/44* (2006.01)
*G06F 17/00* (2006.01)

(52) U.S. Cl.
CPC *G01P 3/44* (2013.01); *G06F 17/00* (2013.01)

(58) Field of Classification Search
USPC .......................................................... 702/88
See application file for complete search history.

(56) References Cited

U.S. PATENT DOCUMENTS

| 6,496,779 | B1 | 12/2002 | Hwang |
| 8,351,773 | B2 | 1/2013 | Nasiri et al. |
| 2012/0266648 | A1 | 10/2012 | Berme et al. |
| 2012/0330594 | A1 | 12/2012 | Lee et al. |

OTHER PUBLICATIONS

Erick Macias, Nine-Axis Sensor Fusion Using the Direction Cosine Matrix Algorithm on the MSP430F5xx Family, SLAA518A—Feb. 2012, pp. 1-15.*
J. Peraire, Lecture L29—3D Rigid Body Dynamics, Fall 2009, pp. 1-13.*
Sara Stančin, Angle Estimation of Simultaneous Orthogonal Rotations from 3D Gyroscope Measurements, Published: Sep. 2, 2011, p. 8536-8549.*
International Search Report and Written Opinion for International Patent Application No. PCT/US2013/025149, International Searching Authority, Alexandria, Virginia, mailed on Apr. 23, 2013, 12 pages.

* cited by examiner

*Primary Examiner* — Tung Lau
(74) *Attorney, Agent, or Firm* — Sterne, Kessler, Goldstein & Fox P.L.L.C.

(57) ABSTRACT

A system and method for estimating angular velocity are provided. The system and method use an accelerometer and magnetometer to estimate an angular velocity in place of a gyroscope in 9-axis sensor fusion to estimate angular orientation. The final angular velocity estimate is constructed from two partially independent angular velocity estimates, one using only magnetometer measurements and the other using only accelerometer measurements. The unobservable portion of each partial angular velocity estimate is provided by a projection from a third complete estimate that uses both accelerometer and magnetometer data.

18 Claims, 8 Drawing Sheets

```
w_from_accel_mag(hlCal,alCal, ...                                          500A
    H_w_buff,A_w_buff,W_KERNEL_SIZE,MAX_KERNEL_SIZE,meas_err_struct} global SR;
    global D2R;
    global R2D;
    global FIXED_ACCEL_DATA_SCALE;

MAX_WINDOW_SIZE = 2 * MAX_KERNEL_SIZE - 1;
    buff_adv = 2 * (MAX_KERNEL_SIZE - W_KERNEL_SIZE);
    w_window_size = 2*W_KERNEL_SIZE - 1;

% Update angular velocity and acceleration estimates from mag and accel
    H_w_buff(:,1:(MAX_WINDOW_SIZE - 1)) = H_w_buff(:,2:MAX_WINDOW_SIZE);
    A_w_buff(:,1:(MAX_WINDOW_SIZE - 1)) = A_w_buff(:,2:MAX_WINDOW_SIZE);
    H_w_buff(:,MAX_WINDOW_SIZE) = hlCal / norm(hlCal);
    A_w_buff(:,MAX_WINDOW_SIZE) = alCal / norm(alCal);

% Quick and dirty high velocity check ( look for 2 sample movement over
    % 0.08 radians, which is about 250dps at 100Hz ODR
    Hdiff = abs(norm(H_w_buff(:,MAX_WINDOW_SIZE) - H_w_buff(:,MAX_WINDOW_SIZE - 2)));
    if Hdiff > 0.06,% guard band for mag noise ... 190 dps
        W_KERNEL_SIZE = 3;
    end
    buff_adv = 2*(MAX_KERNEL_SIZE - W_KERNEL_SIZE);
    w_window_size = 2*W_KERNEL_SIZE - 1;

%General angular velocity estimates using both A and H
    A_w_avg0 = (sum(A_w_buff(:,1+buff_adv:W_KERNEL_SIZE+buff_adv)')/W_KERNEL_SIZE)';
    A_w_avg0 = A_w_avg0 / norm(A_w_avg0);
    H_w_avg0 = (sum(H_w_buff(:,1+buff_adv:W_KERNEL_SIZE+buff_adv)')/W_KERNEL_SIZE)';
    H_w_avg0 = H_w_avg0 / norm(H_w_avg0);
    zhat_est0 = A_w_avg0;
    zhat_est0 = zhat_est0 / norm(zhat_est0);
    yhat_est0 = cross(zhat_est0,H_w_avg0);
    yhat_est0 = yhat_est0 / norm(yhat_est0);
    xhat_est0 = cross(yhat_est0 ,zhat_est0);
    xhat_est0 = xhat_est0 / norm(xhat_est0);
    A_w_avg1 = (sum(A_w_buff(:,(W_KERNEL_SIZE + buff_adv:(2*W_KERNEL_SIZE - 1 + buff_adv)))')/
W_KERNEL_SIZE)';
    A_w_avg1 = A_w_avg1 / norm(A_w_avg1);
    H_w_avg1 = (sum(H_w_buff(:,(W_KERNEL_SIZE + buff_adv:(2*W_KERNEL_SIZE - 1 + buff_adv)))')/
W_KERNEL_SIZE)';
    H_w_avg1 = H_w_avg1 / norm(H_w_avg1);
    zhat_est1 = A_w_avg1;
    zhat_est1 = zhat_est1 / norm(zhat_est1);
    yhat_est1 = cross(zhat_est1,H_w_avg1);
    yhat_est1 = yhat_est1 / norm(yhat_est1);
    xhat_est1 = cross(yhat_est1 ,zhat_est1);
    xhat_est1 = xhat_est1 / norm(xhat_est1);
    R0 = [xhat_est0 yhat_est0 zhat_est0]';
    R1 = [xhat_est1 yhat_est1 zhat_est1]';
    Rrot_0_1 = R0' * R1;    %Inverse equal to transpose for rotation matrix
    % Convert Rrot_0_1 and Rrot_1_2 to angular velocity estimates in
    % radians per second
    [axis,angle_deg] = Rot_2_aa(Rrot_0_1);
    w_full_0_persamp = axis * angle_deg * D2R / (W_KERNEL_SIZE - 1);
    w_full_0_persec = w_full_0_persamp * SR;
    % Note:  if sample rate is not constant, will need to use actual times
    % between sample 1 and sample W_KERNEL_SIZE – 1

% w_m estimates are angular velocity projected to plane normal to H
    % w_a estimates are angular velocity projected to plane normal to A
    HK_M1 = (W_KERNEL_SIZE - 1)/2;
```

FIG. 5A

```
w_m_axis_0 = -cross(H_w_buff(:,1 + HK_M1 + buff_adv),H_w_buff(:,W_KERNEL_SIZE + HK_M1 + buff_adv));
w_m_samp_angle_0 = norm(w_m_axis_0) / (W_KERNEL_SIZE - 1);
if(sum(abs(w_m_axis_0)) > 0), w_m_axis_0 = w_m_axis_0 / norm(w_m_axis_0); end
w_a_axis_0 = -cross(A_w_buff(:,1 + HK_M1 + buff_adv),A_w_buff(:,W_KERNEL_SIZE + HK_M1 + buff_adv));
w_a_samp_angle_0 = norm(w_a_axis_0) / (W_KERNEL_SIZE - 1);
if(sum(abs(w_a_axis_0)) > 0), w_a_axis_0 = w_a_axis_0 / norm(w_a_axis_0); end w_m_0_persamp = w_m_axis_0 * w_m_samp_angle_0;
w_m_0_persec = w_m_0_persamp * SR;
w_a_0_persamp = w_a_axis_0 * w_a_samp_angle_0;
w_a_0_persec = w_a_0_persamp * SR;
H0_avg = (sum(H_w_buff(:,1+buff_adv:(2*W_KERNEL_SIZE-1 + buff_adv))')/ (2*W_KERNEL_SIZE-1))';
A0_avg = (sum(A_w_buff(:,1+buff_adv:(2*W_KERNEL_SIZE-1 + buff_adv))')/ (2*W_KERNEL_SIZE-1))';
w_m_full_0 = w_m_0_persec + (w_full_0_persec' * H0_avg) * H0_avg;
w_a_full_0 = w_a_0_persec + (w_full_0_persec' * A0_avg) * A0_avg;

% Blend the mag-dominated and accel-dominated estimates based on how
% much we trust the current mag and accel measurements. Normalize
% sensor noise to expected angular noise contribution amet = 9.8 / abs(9.8 - norm(single(aICal) / single(FIXED_ACCEL_DATA_SCALE)));
amet = min(amet,15);
mmet = single(30);   %this version presumes mag already calibrated
ka = amet / (meas_err_struct.accel_1Hz_noise * sqrt(SR)/9.8);  %nominal field strength of 9.8m/s^2
%ka = 0;
km = mmet / (meas_err_struct.mag_1Hz_noise/400); %nominal field strength of 400 milli-Gauss
% should use estimated mag field strength if we trust it (may be
% significantly different than 400 milli-gee)
% TODO: Look at making the weighting sticky toward lower values
% (anomalies detected)
w_m_est = (km * w_m_full_0 + ka * w_a_full_0) / (km + ka);
angular_speed = norm(w_m_est) * R2D;
W_KERNEL_SIZE = MAX_KERNEL_SIZE;
% Allow 30 degree movement across w_window_size
if(angular_speed > 250),
    W_KERNEL_SIZE = 3;
elseif(angular_speed > 167),
    W_KERNEL_SIZE = 5;
elseif(angular_speed > 125),
    W_KERNEL_SIZE = 7;
elseif(angular_speed > 100),
    W_KERNEL_SIZE = 9;
elseif(angular_speed > 83),
    W_KERNEL_SIZE = 11;
elseif(angular_speed > 70),
    W_KERNEL_SIZE = 13;
else
    W_KERNEL_SIZE = MAX_KERNEL_SIZE;
end if (W_KERNEL_SIZE > MAX_KERNEL_SIZE), W_KERNEL_SIZE = MAX_KERNEL_SIZE; end

%W_KERNEL_SIZE = 3;

function [axis,angle_deg] = Rot_2_aa(R)
% Usage: [axis,angle_deg] = Rot_2_aa(R)
A = R - R';
axis = [-A(2,3); A(1,3); -A(1,2)];   % axis
naxis = norm(axis);
if(naxis == 0),
    axis = [0;0;1];
    angle_deg = 0;
else
    axis = axis / naxis;
    cs = (R(1,1) + R(2,2) + R(3,3) - 1) / 2;
    angle = acos(cs);
    angle_deg = angle * 180 / pi;
end
```

FIG. 7

ANGULAR VELOCITY ESTIMATION USING A MAGNETOMETER AND ACCELEROMETER

BACKGROUND

1. Field

The embodiments are directed generally to angular velocity estimation, and specifically, to angular velocity estimation using a magnetometer and accelerometer.

2. Background Art

A MEMS rate gyroscope is a device that measures angular velocity. A MEMS gyroscope may be a stand-alone device or included in another electronic device as part of integrated circuit included in a micro-chip. Angular velocity can be integrated over time to compute changes in angular orientation. When combined with other sensors that provide an absolute reference for pitch and roll (accelerometer) or yaw (magnetometer), an estimate of absolute angular orientation can be produced.

Gyroscopes are included in electronic devices to quickly and accurately detect changes in electronic device orientation and to enable high quality estimates of angular orientation as it changes Applications can be developed that take advantage of these capabilities to provide useful functionality to end users. An example of an application that relies on angular rotation includes the positioning of a mobile device in a horizontal or vertical orientation to facilitate text entry and web application formatting and display. Another example includes applications, such as video games, that receive as an input the angular velocity and integrated angular orientation of the electronic device as it is manipulated by a user. Another example is an application that uses angular orientation estimates as inputs to a pointing device such as a motion based mouse.

Gyroscopes, however, are power intensive circuits when run on electronic devices. The intensive power consumption is an energy drain on the electronic device, particularly when the electronic device is powered using a re-chargeable power source, such as a battery. Additionally, a power intensive circuit increases an overall cost for using the electronic device.

Therefore, what is needed are systems and methods that generate an estimated angular velocity using efficient integrated circuits and software that have a low code and data footprint and a low CPU load.

BRIEF SUMMARY

In an embodiment, a system and method for estimating angular velocity are provided. The system and method use an accelerometer and magnetometer to estimate an angular velocity in place of a gyroscope in 9-axis sensor fusion to estimate angular orientation. The final angular velocity estimate is constructed from two partially independent angular velocity estimates, one using only magnetometer measurements and the other using only accelerometer measurements. The unobservable portion of each partial angular velocity estimate is provided by a projection from a third complete estimate that uses both accelerometer and magnetometer data.

In an embodiment, adaptive filter lengths are used to trade off measurement noise against system responsiveness. Filter lengths are set as a function of fast estimates of angular velocity and angular acceleration.

In another embodiment, a system and method for determining a presence of a time-varying magnetic anomaly are provided.

In another embodiment, a system and method for using an angular velocity estimate to estimate a bias offset and sensitivity of the physical rate gyroscope are provided.

Further features and advantages of the embodiments, as well as the structure and operation of various embodiments, are described in detail below with reference to the accompanying drawings. It is noted that the embodiment is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

FIGS. 5A-B are diagrams of source code that determine an angular velocity estimate, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE EMBODIMENTS

The System

Figure 1:
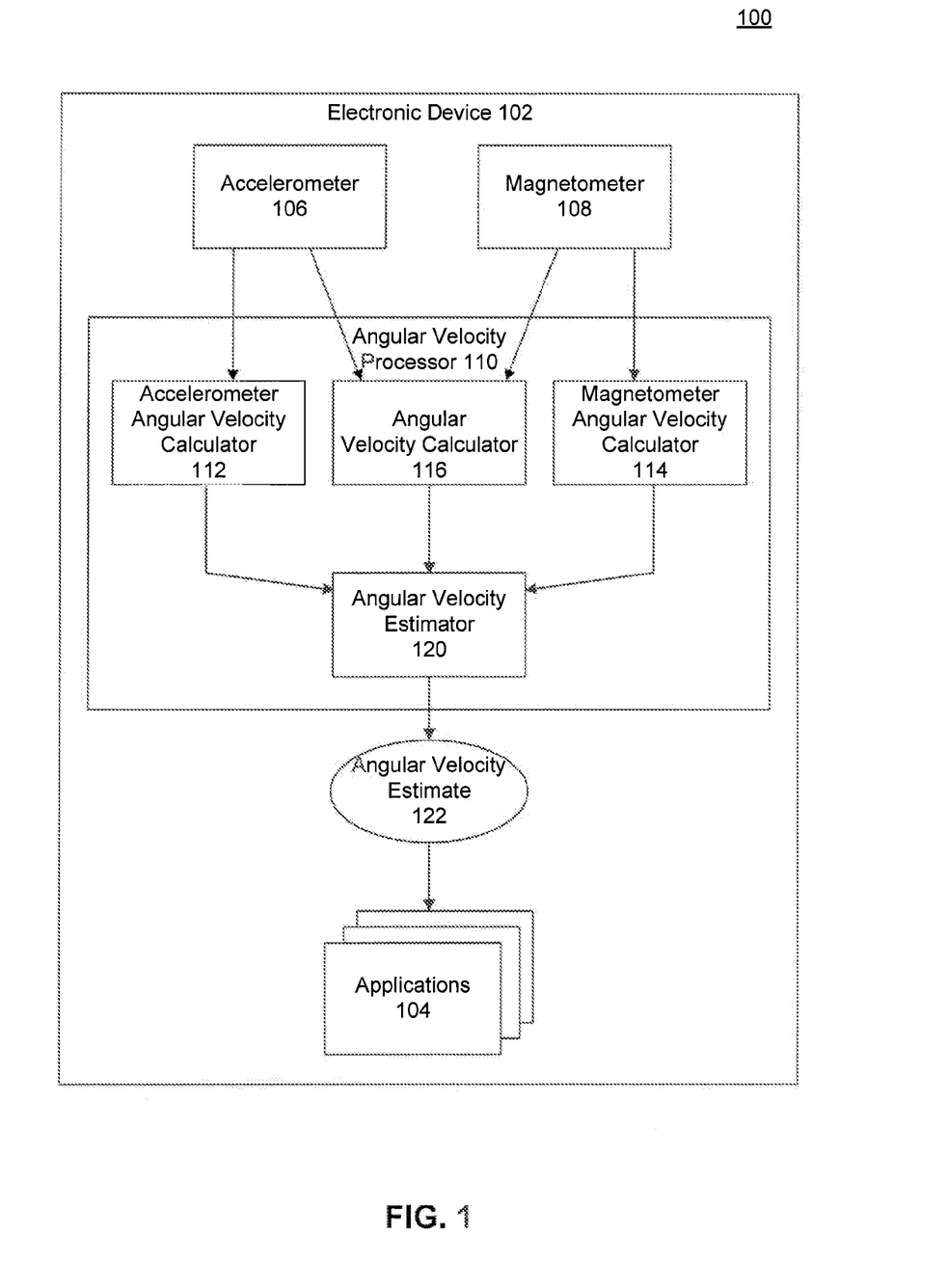
FIG. 1 is a block diagram of an electronic device, according to an embodiment.

FIG. 1 is a block diagram 100 of an electronic device, according to an embodiment. FIG. 1 includes an electronic device 102. Electronic device 102 may be a programmable electronic machine that performs high-speed mathematical and logical operations, and that assembles, stores, correlates and otherwise processes data. Examples of electronic device 102 may include a personal computer, a mobile communication device (e.g. a smartphone, a tablet computing device, and a laptop notebook), a set-top box, a game-console, and an embedded system. The features and hardware generally included in electronic device 102 are described in detail in FIG. 6.

In an embodiment, electronic device 102 may execute or interpret multiple applications 104. Applications 104 may be installed or downloaded to electronic device 102, using a network or the external secondary storage units described in detail in FIG. 6. In another embodiment, applications 104 may be external to electronic device 102, and receive data from electronic device 102.

A network (not shown) may be any network or combination of networks that can carry data communication. Such a network may include, but is not limited to, a local area network, metropolitan area network, and/or wide area network, such as the Internet. A network can support protocols and technologies including, but not limited to, World Wide Web protocols and/or services. Applications 104 are executed on or receive data from electronic device 102.

In an embodiment, electronic device 102 includes an accelerometer 106 and magnetometer 108.

Accelerometer 106 measures the sum of the gravity vector and linear acceleration vector experienced by an object, such as electronic device 102. Magnetometer 108 measures strength and direction of magnetic fields. In an embodiment, magnetometer 108 may be used to measure the Earth's magnetic fields and detect different types of magnetic anomalies. Example magnetic anomalies may be magnetic fields generated by other magnetic objects that may be temporarily or permanently in a vicinity of electronic device 102.

In FIG. 1, accelerometer 106 and magnetometer 108 are shown within electronic device 102. The implementation, however, is not limited to this embodiment. Accelerometer 106 and magnetometer 108 may be outside of an electronic device and may be coupled to electronic device 102 using a wired or wireless network.

Conventionally, a gyroscope determines angular velocity in an electronic device. As described above, however, a gyroscope is a power intensive device that is a power drain on battery powered electronic devices.

Other conventional systems may use a magnetometer, such as the Aichi AMI307, along with an accelerometer, to estimate angular velocity. For example, there is a relationship between changes in the calibrated magnetic field observed by a conventional magnetometer and changes in an angle, such that an estimate of angular velocity can be constructed by examining the partial derivatives of the magnetic field with respect to angular rotation. This relationship, however, may hold true for only small angle changes between each magnetic sample. For example, for small angle changes, such as angle changes between 5 and 10 degrees which correspond to 500 to 1000 dpw with 100 Hz sample rate, the relationship between magnetic field values "x", "y" and "z" and the corresponding angular changes may be approximated as linear.

One way to conventionally determine the estimated angular velocity is through a system of equations that define relationships between "x", "y" and "z" field strength measurements and starting and ending angles of the rotation. The system of equations is constructed independently for rotation around each of the "x", "y" and "z" axes. The system of equations is then solved to determine "x", "y" and "z" axis rotation estimates for changes in "x", "y" and "z" field strengths.

An example set of equations for a rotation of a vector measurement "x" about a "z" axis by an angle $\theta_z$ is below:

$$x_1 = x_0 \cos\theta_z - y_0 \sin\theta_z$$

$$y_1 = y_0 \sin\theta_z + y_0 \cos\theta_z$$

$$z_1 = z_0$$

An example set of equations for a rotation of a vector measurement "x" about a "z" axis by an angle $\theta_z$ is below:

$$x_1 = x_0 \cos\theta_z - y_0 \sin\theta_z$$

$$y_1 = y_0 \sin\theta_z + y_0 \cos\theta_z$$

$$z_1 = z_0$$

An example set of equations for a rotation of a vector measurement "x" about a "z" axis by an angle $\theta_y$ is below:

$$x_1 = x_0 \cos\theta_y - z_1 \sin\theta_y$$

$$y_1 = y_0$$

$$z_1 = z_0 \cos\theta_y - x_1 \sin\theta_y$$

In the examples above, the subscript 0 indicates an initial data value of a sample and the subscript 1 indicates a final data value of a sample, where the final data value of a sample is its value after a single rotation.

Assuming that for a small angle, $\cos x \approx 1 - x^2/2$ and $\sin x \approx x$, the equations above may be reduced to:

$$\begin{bmatrix} \Delta x \\ \Delta y \\ \Delta z \end{bmatrix} \approx \begin{bmatrix} 0 & -z_1 & -y_1 \\ -z_1 & 0 & -x_1 \\ -y_1 & -x_1 & 0 \end{bmatrix} \begin{bmatrix} \theta_x \\ \theta_y \\ \theta_z \end{bmatrix}$$

The equation above connects observable angle changes with measured field strength changes. When solved for the rotation vector θ, as shown below, the equation transforms first order differences in the magnetic field to first order differences in angles, which are the estimates of an angular velocity.

$$\begin{bmatrix} \theta_x \\ \theta_y \\ \theta_z \end{bmatrix} = \frac{1}{2xyz} \begin{bmatrix} -x^2 & xy & xz \\ xy & -y^2 & yz \\ xz & yz & -z^2 \end{bmatrix} \begin{bmatrix} \Delta x \\ \Delta y \\ \Delta z \end{bmatrix}$$

There are several limitations to this conventional approach. First, the equation above becomes indefinite when the position values for "x", "y" and "z", are equal to or close to zero. Second, the matrix inversion required to solve for the rotation vector θ, which is an estimate of the angular velocity, is a power intensive process.

To generate an angular velocity estimate without a gyroscope and the impediments described above, electronic device 102 includes an angular velocity processor 110. In an embodiment, angular velocity processor 110 may be included in a library stored in a memory of electronic device 102. The library may include code configured to execute or be interpreted by a processor. Angular velocity processor 110 determines an angular velocity estimate 122 from field measurements obtained using accelerometer 106 and magnetometer 108. In an embodiment, angular velocity processor 110 may obtain field measurements from accelerometer 106 and magnetometer 108 by way of sensor drivers included in the library or downloaded to electronic device 102.

Angular velocity processor 110 determines that when field measurements change, the axis of rotation of the field is normal to the vectors defined by the starting and ending field measurements. This relationship may be satisfied by a cross product of a single sample of rotation where the single sample of rotation=X0×X1, such that X0 is the rotation vector in the beginning of rotation and X1 is the rotation vector in the end of the rotation. When X0 and X1 are normalized to unit length, the rotation between samples is small and the magnitude of the cross product is approximately the angular rotation between measurements. In an embodiment, the measurements are measured in radians. In a further embodiment, when the small angle approximation breaks down, the rotation becomes increasingly underestimated. In an embodiment, the error may be small for a less than a 10 degree rotation between samples.

To determine angular velocity estimate 122, angular velocity processor 110 includes a magnetometer angular velocity calculator 112, an accelerometer angular velocity calculator 114 and an angular velocity calculator 116. Each of magnetometer angular velocity calculator 114, accelerometer angular velocity calculator 112 and angular velocity calculator 116 determines a respective component of angular velocity estimate 122.

Magnetometer angular velocity calculator 114 determines the partial angular velocity estimate from the field measurements provided by magnetometer 108. The partial angular velocity estimate from magnetometer field measurements may be defined as a cross product $\omega_{m\_partial} = -\widehat{H0} \times \widehat{H1}$, where $\widehat{H0}$ and $\widehat{H1}$ are beginning and ending magnetic field measurements normalized to a unit length. Additionally, magnetometer angular velocity calculator 114 defines the axis of rotation as:

$$\frac{\omega_{m\_partial}}{norm2(\omega_{m\_partial})}$$

and the angle of rotation between samples as:

$$norm2(\omega_{m\_partial})$$

Accelerometer angular velocity calculator 112 determines the partial angular velocity estimate from the measurements provided by accelerometer 106. The partial angular velocity estimate from the accelerometer field measurements is defined as a cross product $\omega_{a\_partial} = -\widehat{A0} \times \widehat{A1}$, where $\widehat{A0}$ and $\widehat{A1}$ are beginning and ending accelerometer measurements normalized to a unit length. Additionally, accelerometer angular velocity calculator 112 defines the axis of rotation as:

$$\frac{\omega_{a\_partial}}{norm2(\omega_{a\_partial})}$$

and the angle of rotation between samples as:

$$norm2(\omega_{a\_partial})$$

In an embodiment, the $\omega_{m\_partial}$ and $\omega_{a\_partial}$ angular velocity estimates are incomplete because they do not contain information regarding angular velocity around their respective characteristic axes. For instance, for $\omega_{a\_partial}$ the axis that cannot be observed is the axis in the direction of gravity, and for $\omega_{m\_partial}$ the axis that cannot be observed is the axis along the direction of the magnetic field. To compensate for the lack of information for the angular velocity provided by $\omega_{m\_partial}$ and $\omega_{a\_partial}$, angular velocity calculator 116 determines the missing components of the angular velocity provided by $\omega_{m\_partial}$ and $\omega_{a\_partial}$ along the missing axes. To determine the estimate of the angular velocity along the missing axes, angular velocity calculator 116 derives an estimate of the missing angular velocity component by using the accelerometer and magnetometer measurements and projects the derived estimate of the missing angular velocity components onto the axes that are not observable from the accelerometer or magnetometer field measurements.

In an embodiment, let H be a magnetic field vector in world coordinates, and A be a gravity vector in world coordinates. A person skilled in the art will appreciate that world coordinates define objects by an orientation matrix, which includes in its three columns the Cartesian coordinates of three points. These points may then be used to define the orientation of axes, and are tips of the unit vectors aligned with those axes.

In an embodiment, vector A may be the same as a calibrated accelerometer measurement in the absence of linear acceleration. In an embodiment, let the x-axis be the magnetic North in world coordinates, such that the H vector in world coordinates has "x" and "z" components when the device is facing north. In an embodiment, the H vector may be defined such that it only has "x" and "z" components. When the H vector is defined as described above, $\hat{y}=H\times A$, normalized to unit length, and $\hat{x}=\hat{y}\times\hat{z}$, which is $(H\times A)\times A$, normalized to unit length.

Next, let the orientation at time 0 be a rotation matrix R0, and the orientation at time 1 be a rotation matrix R1, where R1=R_delta*R0 and where R_delta is the rotation matrix that transforms R0 into R1.

Solving for R_delta, R_delta=inv(R0)*R1.

Since R0 is a rotation matrix, the inverse is the same as the transpose, which yields R_delta=R0$^T$ R1. The R_delta matrix allows for the individual rotations to be read from the R_delta matrix by converting the individual rotations from the rotation matrix to an axis/angle format. Therefore, $\omega_{m\_a_{full}}$ may be determined as a single sample rotation by R_delta that uses both accelerometer and magnetometer field measurements.

In an embodiment, angular velocity estimator 120 receives $\omega_{m\_partial}$, generated by magnetometer angular velocity calculator 114, $\omega_{a\_partial}$, generated by accelerometer angular velocity calculator 112, and $\omega_{m\_a_{full}}$, generated by angular velocity calculator 116. Angular velocity estimator 120 then generates angular velocity estimate 122 by combining $\omega_{m\_partial}$, $\omega_{a\_partial}$, and $\omega_{m\_a_{full}}$, as described below.

In an embodiment, angular velocity estimator 120 compensates $\omega_{m\_partial}$ and $\omega_{a\_partial}$ for an unobservable component described above. For example, angular velocity estimator 120 combines $\omega_{m\_partial}$ with a projection of $\omega_{m\_a_{full}}$ to the magnetic field axis to fill the unobservable component associated with the magnetometer measurements. For instance, let $\omega_{m\_fill}$ be the projection of $\omega_{m\_a_{full}}$ to fill in the unobservable component associated with magnetometer measurements as it is projected onto the magnetic field axis. The scale factor of the projection is the dot product of $\omega_{m\_a_{full}} \cdot H$. The direction of the magnetic field estimate in the world coordinates is H normalized to unit length. Therefore, in an embodiment:

$$\omega_{m\_fill} = \frac{(\omega_{m\_a_{full}} H)}{norm2(H)} \hat{H}$$

Once angular velocity estimator 120 determines $\omega_{m\_fill}$, angular velocity estimator 120 determines the magnetometer component $\omega_{m\_full}$ for angular velocity estimate 122, as shown below:

$$\omega_{m\_full} = \omega_{m\_partial} + \omega_{m\_fill}$$

In another example, angular velocity estimator 120 also combines $\omega_{a\_partial}$ with a projection of $\omega_{m\_a_{full}}$ along the gravitation field axis to fill the unobservable component associated with the accelerometer measurements. For example, angular velocity estimator 120 combines $\omega_{a\_partial}$ with a projection of $\omega_{m\_a_{full}}$ to fill in the unobservable component associated with accelerometer measurements. For instance, let $\omega_{a\_fill}$ be the projection of $\omega_{m\_a_{full}}$ that fills the unobservable component associated with accelerometer measurements as it is projected onto the gravitational field axis. The scale factor of the projection is the dot product of $\omega_{a\_full} \cdot A$. The direction of the gravitational field estimate in the world coordinates is A normalized to unit length. Therefore, in an embodiment:

$$\omega_{a\_fill} = \frac{(\omega_{m\_a_{full}} A)}{norm2(A)} \hat{A}$$

When angular velocity estimator 120 determines $\omega_{a\_fill}$, angular velocity estimator 120 determines the accelerometer component $\omega_{a\_full}$ for the angular velocity estimate 122, as shown below:

$$\omega_{a\_full} = \omega_{a\_partial} + \omega_{a\_fill}$$

In an embodiment, once angular velocity estimator 120 determines $\omega_{m\_full}$ and $\omega_{a\_full}$ angular velocity estimator 120 then determines angular velocity estimate 122, defined as $\omega_{est}$, using $\omega_{m\_full}$ and $\omega_{a\_full}$. In a further embodiment, angular velocity estimator 120 may also use weights to determine angular velocity estimate 122. Angular velocity estimator 120 uses weights when it determines whether to rely more on ($\omega_{m\_fill}$ or $\omega_{a\_fill}$ while determining angular velocity estimate 122. For example, in one instance the noise associated with magnetometer field measurements may be lower than the noise associated with accelerometer field measurements. In this instance, angular velocity estimator 120 relies more on $\omega_{m\_full}$ than $\omega_{a\_full}$ to determine angular velocity estimate 122. On the other hand, when noise associated with magnetometer field measurements may be higher than the noise associated with accelerometer field measurements, angular velocity estimator 120 relies more on $\omega_{a\_full}$ than $\omega_{m\_full}$ to determine angular velocity estimate 122. Thus, angular velocity estimate 122 becomes a weighted sum of $\omega_{m\_full}$ and $\omega_{a\_full}$, where a weight determines the trustworthiness of A and H estimates for the current measurement sample. Below is an example of a weighted angular velocity estimate 122, $\omega_{est}$:

$$\omega_{est} = (k_h \omega_{m\_full} + k_A \omega_{a\_full})/(k_A + k_H)$$

where $k_h$ and $k_A$ are weight factors as applied to full and $\omega_{a\_full}$ respectively.

In an embodiment, $k_h$ and $k_A$ may be based on the sensor noise and anomaly detection associated with magnetometer 108 and accelerometer 106, respectively.

In an embodiment, $k_h$ may be determined as follows:

$$k_h = \sigma_{mf} * qmet$$

where $\sigma_{mf}$ is a magnetic contribution to fusion angle noise and qmet is a current estimate of calibration quality associated with magnetometer 108. In an embodiment, qmet>=30.

In an embodiment, $k_A$ may be determined as follows:

$$k_A = \sigma_{af} * Amet$$

where $\sigma_{af}$ is an acceleration contribution to fusion angle noise and Amet=1/(abs(1−mag(A)), where A components are measured in g(s). In an embodiment, Amet<30.

In an embodiment, $\sigma_{af}$ and $\sigma_{mf}$ may be estimated by taking a noise standard deviation of accelerometer 106 and magnetometer 108, respectively, and dividing the noise standard deviation by a nominal field strength associated with accelerometer 106 and magnetometer 108. In an embodiment, the nominal field strength may be 1 g for accelerometer 106 (for gravity on Earth) and 400 milli-gauss for magnetometer 108 (which is an estimate of the Earth's magnetic field.) When noise components $\sigma_a$ and $\sigma_m$ are normal to the reference gravity and magnetic fields, converting from a sensor sample noise to angle noise for noise normal to the reference gravity and magnetic fields, yields angles of arctan (sample noise/nominal field strength). This conversion approaches a sample noise/nominal field strength value for small angles.

For example, a sensor noise value for the Kionix KXCJ9 accelerometer manufactured by Kionix, Inc., of Ithaca, N.Y., is 150 micro-g/sqrt(Hz). At 100 Hz, the sensor noise is therefore 1.5 milli-g. Applying these values to the equation above, the $\sigma_a = 1.5/1000 = 0.0015$ radians or approximately 0.086 degrees.

In another example, the noise value for a magnetometer, such as the Aichi AMI 307, manufactured by Aichi Micro Intelligent Corporation of Japan, is 0.6 milli-gauss. Applying this value to the equation above, $\sigma_{mf} = 0.6/400 = 0.0015$ radians or approximately 0.086 degrees.

In an embodiment, other estimates for determining $\sigma_{mf}$ of magnetometer 108 may be used. For instance, instead of using a noise value for a magnetometer 108 (such as 400 milli-gauss), an estimate of the magnetic field strength may be used, when the estimate is of high confidence. For instance, the estimate may be of high confidence when a calibration of magnetometer 108 is highly converged. In an embodiment, using an estimate of the magnetic field strength that is of high confidence may result in using different and potentially more precise weight factors for different locations on Earth.

Using Filtered Input Data to Construct Angular Velocity Estates

Figure 2:
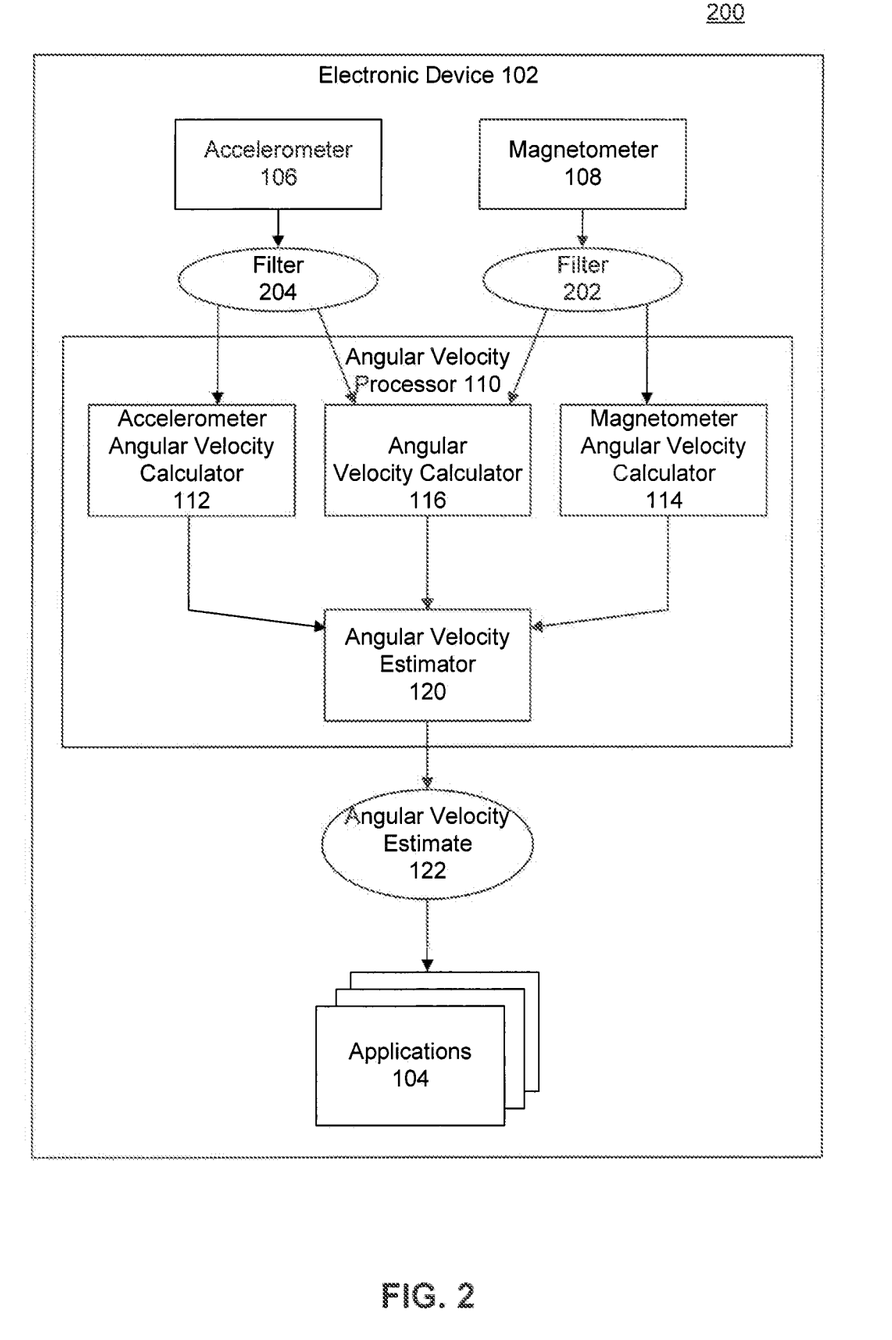
FIG. 2 is a block diagram of an electronic device that includes filters for filtering data from an accelerometer and magnetometer, according to an embodiment.

In a further embodiment, angular velocity processor 110 may receive filtered H and A values from magnetometer 108 and accelerometer 106. FIG. 2 is a block diagram 200 that shows filters for filtering accelerometer and magnetometer data. Block diagram 200 includes filter 202 and filter 204. Filter 202 filters H values from magnetometer 108 and filter 204 filters A values from accelerometer 106. Once filters 202 and 204 filter H and A values, filters 202 and 204 pass the filtered H and A to magnetometer angular velocity calculator 114, accelerometer angular velocity calculator 112 and angular velocity calculator 116.

In an embodiment, a filter (such as filter 202 or 204) may be a data window that includes data samples collected during a particular time interval. The data samples in the filter may be combined, averaged, etc., to provide one data point to angular velocity processor 110.

In an embodiment, the length of the filter may be varied as a function on the estimated angular velocity. For instance, since the noise is more visible on top of slower movements, a longer filter may be used for slower estimated angular velocity calculations, than for the filter used for quicker estimated angular velocity calculations. In a further embodiment, the length of filters 202 and 204 may be dynamically changed as angular velocity estimate 122 changes.

In another embodiment, the length of the filter may be varied as a function on the estimated angular acceleration. For instance, a longer filter may be used for low angular acceleration and a shorter filter may be used for higher angular acceleration. As with angular velocity, the length of filters 202 and 204 may be dynamically changed as angular acceleration changes.

In an embodiment, angular velocity processor 110 performs some or all calculations using fixed point arithmetic. A person skilled in the art will appreciate that in fixed point arithmetic, a fixed point number representation is a real data type for a number that has a fixed number of digits before and after a radix point.

In electronic devices 102 that may consume power, or that may not be as sensitive to precise angular velocity estimates, angular velocity estimate 122 may be generated using a $\omega_{m\_a_{full}}$ measurement, where accelerometer 106 and magnetometer 108 field measurements were filtered using filters 202 and 204.

Method for Determining an Angular Velocity Estimate

Figure 3:
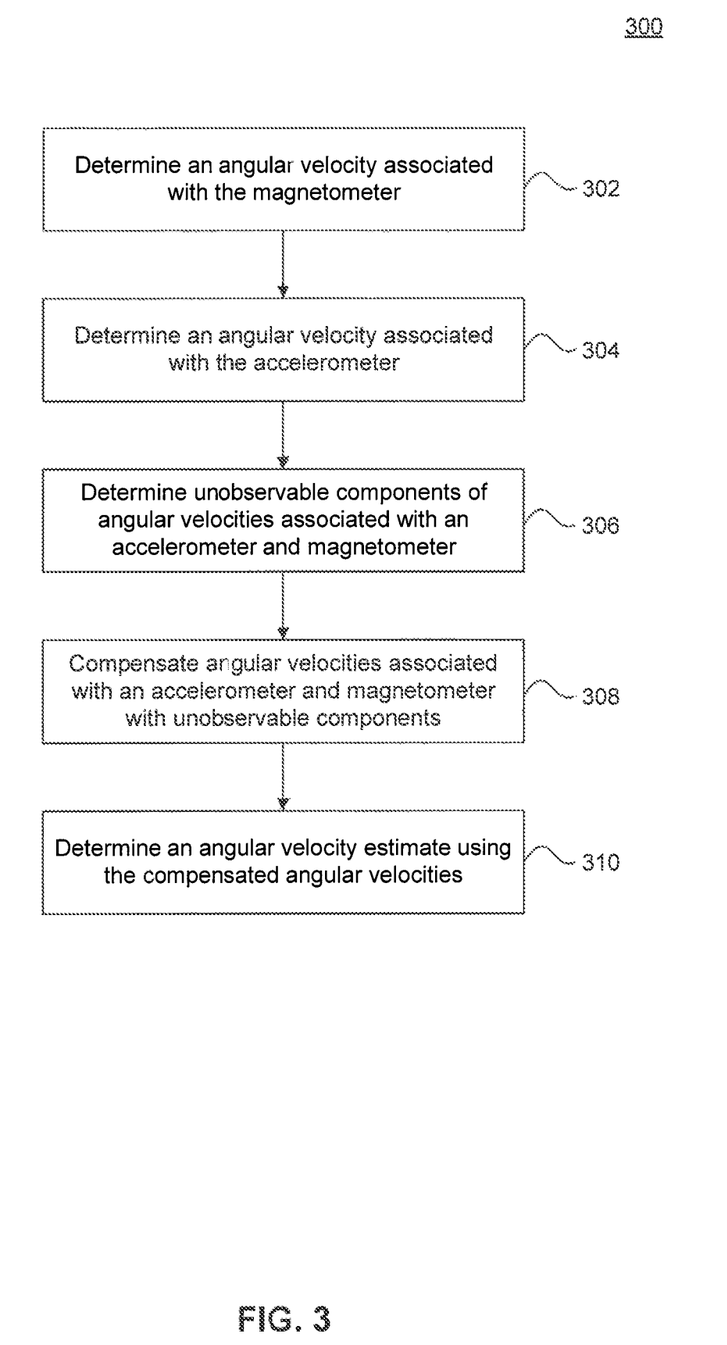
FIG. 3 is a flowchart of a method for determining angular velocity, according to an embodiment.

FIG. 3 is a flowchart of a method 300 for determining an angular velocity estimate, according to an embodiment.

At step 302, an angular velocity component associated with a magnetometer is determined. For example, magnetometer angular velocity calculator 114 determines $\omega_{m\_partial}$ as a cross product between initial and final field measurements $\widehat{H0}$ and $\widehat{H1}$ that are normalized to unit length, where $\widehat{H0}$ and $\widehat{H1}$ are field measurements provided by magnetometer 108. In an embodiment, initial and final field measurements $\widehat{H0}$ and $\widehat{H1}$ may be filtered field measurements.

At step 304, an angular velocity component associated with the accelerometer is determined. For example, accelerometer angular velocity calculator 112 determines $\omega_{a\_partial}$ as a cross product between $\widehat{A0}$ and $\widehat{A1}$, where $\widehat{A0}$ and $\widehat{A1}$ are the beginning and ending measurements provided by accelerometer 106 that are normalized to unit length. In an embodiment, initial and final field measurements $\widehat{A0}$ and $\widehat{A1}$ may be filtered field measurements.

At step 306, unobservable components from the angular velocities components associated with an accelerometer and magnetometer are determined. For example, angular velocity calculator 116 determines $\omega_{m\_a_{full}}$ using accelerometer 106 and magnetometer 108 measurements. Using $\omega_{m\_a_{full}}$, angular velocity estimator 120 determines $\omega_{m\_fill}$ which is a projection of $\omega_{m\_a_{full}}$ to fill the unobservable component associated with magnetometer field measurements projected onto the magnetic field axis. In an embodiment, $$\omega_{m\_fill} = \frac{(\omega_{m\_a_{full}} H)}{norm2(H)} \hat{H}.$$

Additionally, using $\omega_{m\_a_{full}}$, angular velocity estimator 120 determines $\omega_{a\_fill}$, which is a projection of $$\omega_{m_{a_{full}}}$$

to fill the unobservable component associated with accelerometer measurements projected onto the gravitational field axis. In an embodiment, $\omega_{a\_fill}=$ $$\frac{(\omega_{m_{a_{full}}} A)}{norm2(A)} \hat{A}.$$

At step 308, angular velocities components associated with an accelerometer and magnetometer are compensated with the respective unobservable components. For example, angular velocity estimator 120 determines the magnetometer estimate for the angular velocity as $\omega_{m\_full} = \omega_{m\_partial} + \omega_{m\_fill}$. Additionally, angular velocity estimator 120 determines the accelerometer estimate for the angular velocity $\omega_{a\_full}$ as $\omega_{a\_partial} + \omega_{a\_fill}$.

At step 310, angular velocity estimate is determined. For example, angular velocity estimate 122, $\omega_{est}$, may be the weighted sum of $\omega_{m\_full}$ and $\omega_{a\_full}$. In another embodiment, weights may be based on the trustworthiness of A and H estimates for the current measurement sample.

Calibration of a Physical Gyroscope During Fast Motion

In an embodiment, angular velocity estimate 122 may be used to calibrate a physical rate gyroscope. The physical rate gyroscope may be calibrated in terms of the bias offset and sensitivity. A bias offset may be an offset by which a physical rate gyroscope outputs an angular velocity when the physical rate gyroscope does not experience rotation. Sensitivity may be a measure of how sensitive the gyroscope is to detecting changes in the angular velocity.

Figure 4:
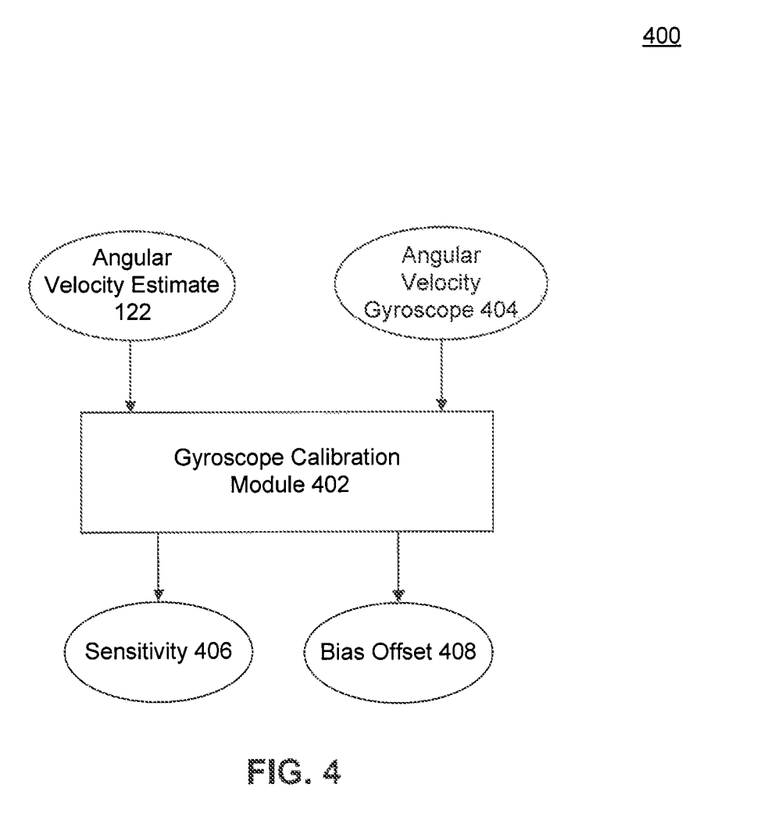
FIG. 4 is a block diagram for calibrating a gyroscope using an estimated angular velocity, according to an embodiment.

FIG. 4 is a block diagram 400 of a gyroscope calibration module for calibrating a gyroscope using an estimated angular velocity, according to an embodiment.

In one embodiment, gyroscope calibration module 402 determines sensitivity 406 of a calibrated gyroscope. To determine sensitivity 406 of the calibrated gyroscope, gyroscope calibration module 402 receives angular velocity estimate 122 and an angular velocity 404, where angular velocity 404 is generated by the gyroscope. Gyroscope calibration module 402 determines sensitivity 406 by dividing angular velocity estimate 122 by angular velocity 404.

In another embodiment, gyroscope calibration module 402 determines sensitivity 406 and bias offset 408 of a non-calibrated gyroscope. In an embodiment, when a physical rate gyroscope is not calibrated, then the angular velocity indicated by the physical rate gyroscope is related to the angular velocity estimate 122 by an affine function estimate $\omega_{ma} = S(\omega_{physical} - bias_{physical})$, where S is defined as sensitivity 406 of the gyroscope, $bias_{physical}$ is the bias offset 408, $\omega_{ma}$ is angular velocity estimate 122 and $\omega_{physical}$ is the angular velocity 404. In an embodiment, S and $bias_{physical}$ may be derived by performing a linear regression on the data points generated by angular velocity estimate 122 and angular velocity 404 generated by the physical rate gyroscope.

Detecting Magnetic Anomaly

In an embodiment, in the absence of linear acceleration or a magnetic anomaly, $\omega_{m\_partial}$, $\omega_{a\_partial}$, and $\omega_{m\_a_{full}}$ may show agreement with each other. However, $\omega_{m\_partial}$ and $\omega_{a\_partial}$ may diverge in the presence of either linear acceleration or a magnetic anomaly.

In an embodiment, linear acceleration may be detected using a simple metric. For example, when the magnitude of the acceleration vector measured by the accelerometer varies from the long term average (which on Earth is typically 9.81 m/s^2 due to gravity alone), linear acceleration contributes to the acceleration vector. The bigger the difference in the magnitude, the more linear acceleration is present. However, when $\omega_{m\_partial}$ and $\omega_{a\_partial}$ diverge in the absence of linear acceleration, the divergence may be attributed to a magnetic anomaly. The anomaly detection may cause angular velocity estimator 120 to rely less weight $k_h$ during angular velocity estimate 122 calculations.

Source Code for Determining Angular Velocity Estimate

FIGS. 5A-B are diagrams 500A-B of source code that determines an angular velocity estimate according to the embodiments described above. In FIG. 5, "w_from_accel_mag" function receives H and A field measurements from magnetometer 108 and accelerometer 106 and determines angular velocity estimate 122.

Determining Angular Velocity Estimate Using Integrated Circuit

Figure 6:
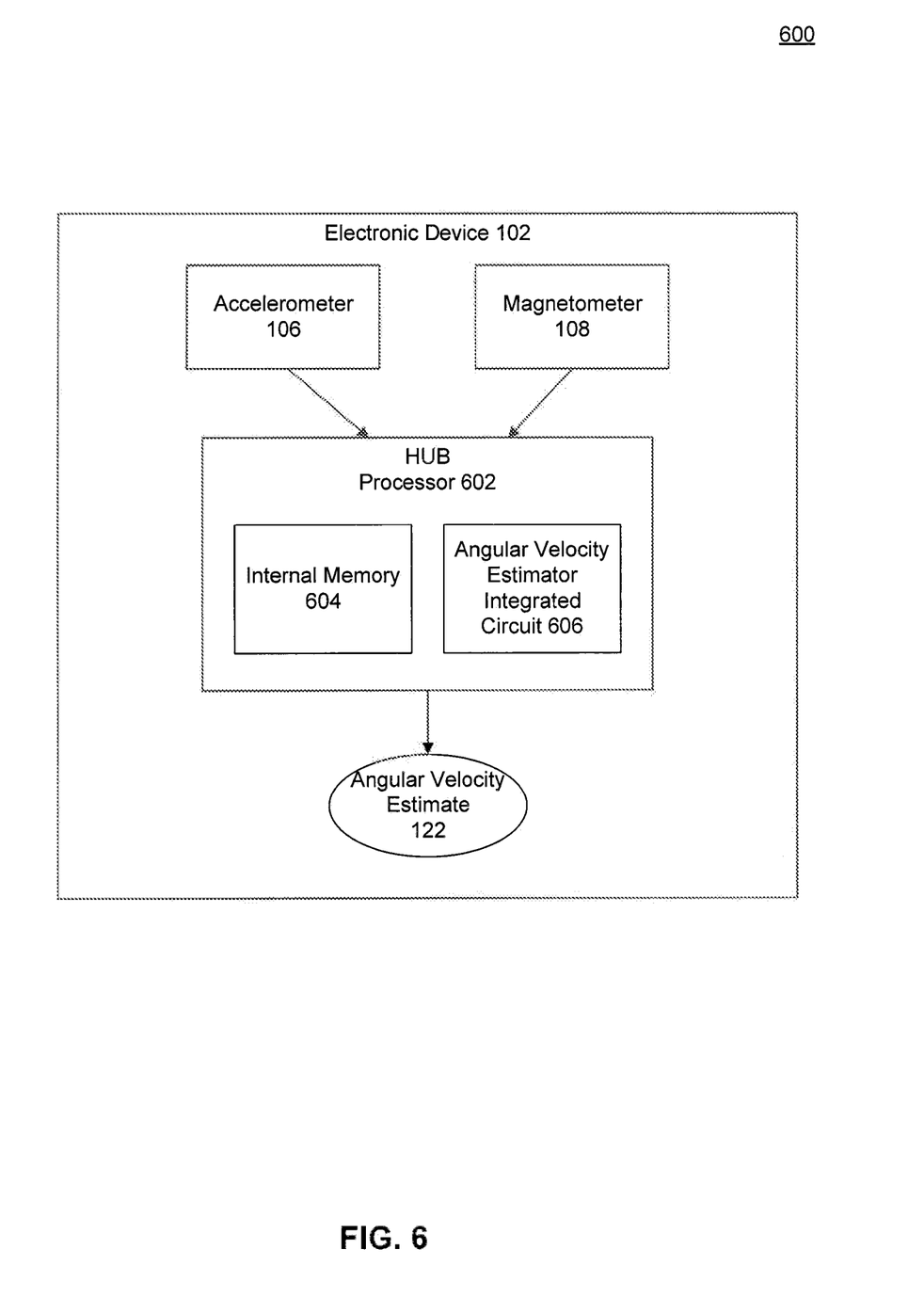
FIG. 6 is a block diagram of an electronic device having a specialized processor, according to an embodiment.

FIG. 6 is a block diagram 600 of an electronic device having a specialized processor, where the embodiment may be implemented.

In an embodiment, electronic device 102 may include a HUB processor 602. HUB processor 602 is a micro-processor within electronic device 102 that includes specialized integrated circuits and an internal memory 604. Internal memory 604 may be one of the memories described in detail in FIG. 7. Integrated circuits in HUB processor 602 execute instructions stored in internal memory 604. For instance, internal memory 604 may store instructions for generating angular velocity estimate 122, as described above.

In an embodiment, HUB processor 602 includes an angular velocity estimator integrated circuit 606. Angular velocity estimator integrated circuit 606 is a hardware circuit that performs the functionality of angular velocity processor 110 in hardware.

For instance, accelerometer 106 and magnetometer 108 may be connected to HUB processor 602. Accelerometer 106 and magnetometer 108 transmit field measurements to HUB processor 602. In an embodiment, before the field measurements generated by accelerometer 106 and magnetometer 108 are received by HUB processor, the field measurements pass through an analog to digital converter (not shown). The analog to digital converter transforms the field measurements from analog to digital form.

HUB processor 602 forwards the field measurements to angular velocity estimator integrated circuit 606. Because angular velocity estimator integrated circuit 606 is a circuit specialized for generating angular velocity estimate 122, the power and processing time for generating angular velocity estimate 122 using angular velocity estimator integrated circuit 606 may be superior to that of another processor executing on electronic device 102.

When angular velocity estimator integrated circuit 606 receives the field measurements, angular velocity estimator integrated circuit 606 retrieves instructions for processing the field measurements from internal memory 604 and processes the field measurements according to the retrieved instructions. Upon completion, angular velocity estimator integrated circuit 606 generates angular velocity estimate 122 that is then passed to applications 104 on electronic device 102.

In an embodiment, other processors, such as processors described in detail in FIG. 7, below, are also included in electronic device 102.

Computing Environment

Figure 7:
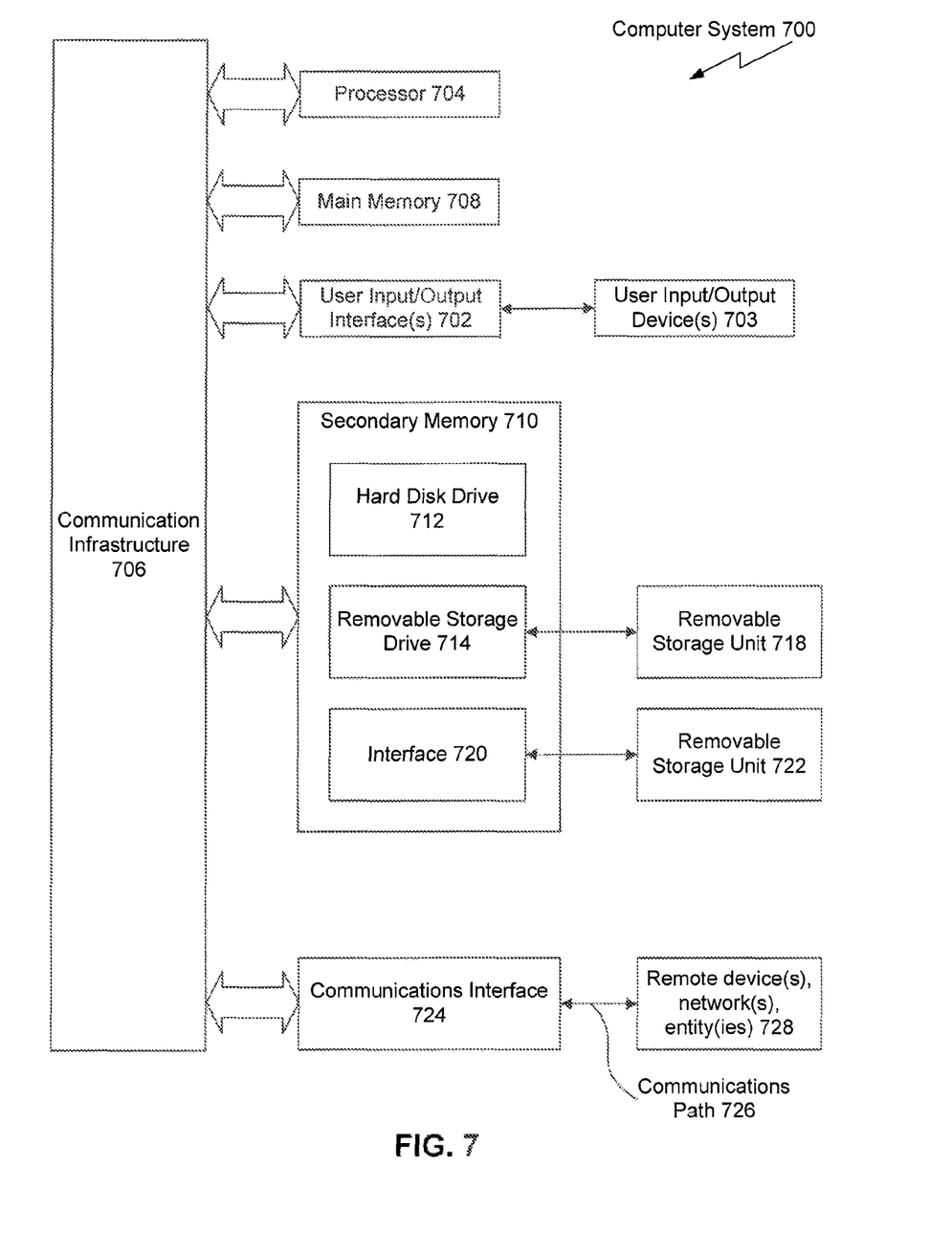
FIG. 7 is a block diagram of a computing environment where the embodiments may be implemented.

Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, to name a few examples.

Computer system 700 includes one or more processors (also called central processing units, or CPUs), such as a processor 704. Processor 704 is connected to a communication infrastructure or bus 706. In an embodiment, processor 704 may be a graphics processing unit (GPU). A GPU is a processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or secondary memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, or any other computer data storage device. Removable storage drive 714 reads from and/or writes to removable storage unit 718 in a well-known manner.

According to an exemplary embodiment, secondary memory 710 may include other means, instrumentalities or approaches for allowing computer programs and/or other instructions and/or data to be accessed by computer system 700. Such means, instrumentalities or approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections of any) may set forth one or more but not all exemplary embodiments as contemplated by the inventor(s), and thus, are not intended to limit the embodiments or the appended claims in any way.

While the embodiments have been described herein with reference to exemplary embodiments for exemplary fields and applications, it should be understood that the subject matter is not limited thereto. Other embodiments and modifications thereto are possible, and are within the scope and spirit of the subject matter. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the embodiments should not be limited by any of the above-described exemplary embodiments, but should be defined only in accordance with the following claims and their equivalents.

What is claimed is:

1. A system comprising:
an angular velocity processor stored in memory, executing on a processor, and causing the processor to:
determine a first angular velocity component from magnetic vector measurements provided by a magnetometer;
determine a second angular velocity component from gravitational vector measurements provided by an accelerometer;
determine a third angular velocity component from a combination of measurements provided by the magnetometer and accelerometer, wherein the third angular velocity component compensates for measurements that are not observed by the magnetic vector and the gravitational vector and are not included in determining the first angular velocity component and determining the second angular velocity component;
compensate the first angular velocity component with a projection of the third angular velocity component around a first unobservable axis;
compensate the second angular velocity component with a projection of the third angular velocity component around a second unobservable axis; and
generate an angular velocity estimate using the compensated first angular velocity component and the compensated second angular velocity component and without using a measurement from a gyroscope.

2. The system of claim 1, wherein the angular velocity processor further causes the processor to generate the angular velocity estimate using a first weight associated with the first angular velocity component and a second weight associated with the second angular velocity component.

3. The system of claim 2, wherein the first and second weights are based on a fusion angle noise.

4. The system of claim 2, wherein the first weight is based on calibration associated with the magnetometer.

5. The system of claim 1, wherein the angular velocity processor further causes the processor to determine the first angular velocity component using a cross product between the magnetic vector measurements of the magnetometer, wherein the magnetic vector measurements are normalized to unit length.

6. The system of claim 1, wherein the angular velocity processor further causes the processor to determine the second angular velocity component using a cross product between the gravitational vector measurements of the accelerometer, wherein the gravitational vector measurements are normalized to unit length.

7. The system of claim 1, wherein the angular velocity processor further causes the processor to determine the third angular velocity component using a rotation matrix comprising the magnetic vector measurements of the magnetometer and the gravitational vector measurements of the accelerometer.

8. The system of claim 1, wherein the angular velocity processor further causes the processor to calculate the projection of the third angular velocity component around the first unobservable axis using a dot product between the third angular velocity component and the magnetic vector measurements of the magnetometer normalized to unit length.

9. The system of claim 8, wherein the first unobservable axis is an axis in the direction of the magnetic field vector.

10. The system of claim 1, wherein the angular velocity processor further causes the processor to calculate the projection of the third angular velocity component around the second unobservable axis using a dot product between the third angular velocity component and the gravitational vector measurements of the accelerometer normalized to unit length.

11. The system of claim 10, wherein the second unobservable axis is in the direction of the gravitation field vector.

12. The system of claim 1, wherein the angular velocity processor causes the processor to determine the first and second angular velocity components using filtered magnetic vector and gravitational vector measurements.

13. The system of claim 12, further comprising a filter stored in the memory and wherein the filter causes the processor to filter the magnetic vector measurements provided by the magnetometer based on a function associated with the estimated angular velocity.

14. The system of claim 12, further comprising a filter stored in the memory and wherein the filter causes the processor to filter the gravitational vector measurements provided by the accelerometer based on a function associated with the estimated angular velocity.

15. The system of claim 12, further comprising a filter stored in the memory and wherein the filter causes the processor to filter the magnetic vector measurements provided by the magnetometer based on a function associated with an estimated angular acceleration.

16. The system of claim 12, further comprising a filter stored in the memory and wherein the filter causes the processor to filter the gravitational vector measurements provided by the accelerometer based on a function associated with an estimated angular acceleration.

17. The system of claim 1, further comprising a gyroscope calibration module stored in the memory and executing on the processor and causing the processor to:
    determine sensitivity of a bias-calibrated gyroscope using the angular velocity estimate and an angular velocity generated using the calibrated gyroscope.

18. The system of claim 1, further comprising a gyroscope calibration module stored in the memory and executing on the processor and causing the processor to:
    determine sensitivity and a bias offset of a non-calibrated gyroscope using the angular velocity estimate and an angular velocity generated using the non-calibrated gyroscope and linear regression.

* * * * *